(12) United States Patent
Jang et al.

(10) Patent No.: US 10,058,804 B2
(45) Date of Patent: Aug. 28, 2018

(54) FILTER DEVICE

(71) Applicant: HYUNDAI HEAVY INDUSTRIES CO., LTD., Ulsan (KR)

(72) Inventors: Won Taek Jang, Ulsan (KR); Kyung Nam Chung, Ulsan (KR); Yang Gyu Kim, Ulsan (KR); Gil Ju Jeong, Yangsan-si (KR); Tae Jin Rhee, Yongin-si (KR); Ki Hoon Han, Ulsan (KR); Sung-Hwan Yoon, Busan (KR); Hyun Woo Lee, Busan (KR); Seunghye Oh, Seoul (KR)

(73) Assignee: Hyundai Heavy Industries Co., Ltd., Ulsan (KR)

( * ) Notice: Subject to any disclaimer, the term of this patent is extended or adjusted under 35 U.S.C. 154(b) by 188 days.

(21) Appl. No.: 15/036,404

(22) PCT Filed: Nov. 12, 2014

(86) PCT No.: PCT/KR2014/010827
§ 371 (c)(1),
(2) Date: May 12, 2016

(87) PCT Pub. No.: WO2015/076524
PCT Pub. Date: May 28, 2015

(65) Prior Publication Data
US 2016/0263499 A1     Sep. 15, 2016

(30) Foreign Application Priority Data

Nov. 21, 2013   (KR) .................. 10-2013-0142457
Nov. 21, 2013   (KR) .................. 10-2013-0142539

(51) Int. Cl.
*B01D 29/66*        (2006.01)
*B01D 29/33*        (2006.01)
(Continued)

(52) U.S. Cl.
CPC .......... *B01D 29/668* (2013.01); *B01D 29/33* (2013.01); *B01D 29/52* (2013.01); *B01D 29/682* (2013.01);
(Continued)

(58) Field of Classification Search
None
See application file for complete search history.

(56) References Cited

U.S. PATENT DOCUMENTS 7,691,274 B2    4/2010   Wnuk et al.
8,216,469 B2    7/2012   Wnuk et al.
(Continued)

FOREIGN PATENT DOCUMENTS

CN      2193197 Y      3/1995
CN      2508833 Y      9/2002
(Continued)

OTHER PUBLICATIONS

European Search Report dated May 29, 2017; International Application No. PCT/KR2014010827; 8 pages; European Patent Office, Munich, Germany.
(Continued)

*Primary Examiner* — Krishnan S Menon
(74) *Attorney, Agent, or Firm* — Andrew D. Fortney; Central California IP Group, P.C.

(57) ABSTRACT

Disclosed is a filter device. The filter device includes a filter housing including an inflow port, through which ballast water flows in, and an outflow port through which the ballast water flows out, a plurality of filter members provided in the filter housing to filter out a foreign substance included in the ballast water, and a backwashing unit coupled to at least one of the plurality of filter members to filter out the foreign substance by using a difference internal pressure and atmospheric pressure. The backwashing unit is provided for the (Continued)

ballast water to flow in so that when it is required for the backwashing unit to remove the foreign substance, at least one of the plurality of filter members coupled to the backwashing unit filters out the foreign substance included in the ballast water.

17 Claims, 9 Drawing Sheets

(51) Int. Cl.
  *B01D 29/52* (2006.01)
  *B01D 29/70* (2006.01)
  *B01D 29/68* (2006.01)
  *C02F 1/00* (2006.01)
  *C02F 103/00* (2006.01)

(52) U.S. Cl.
  CPC ........ *C02F 1/001* (2013.01); *C02F 2103/008* (2013.01); *C02F 2201/005* (2013.01)

(56) References Cited

U.S. PATENT DOCUMENTS

| | | |
|---|---|---|
| 8,518,274 B2 | 8/2013 | Wnuk et al. |
| 2008/0067119 A1 | 3/2008 | Wnuk et al. |
| 2010/0276356 A1 | 11/2010 | Wnuk et al. |
| 2012/0228239 A1 | 9/2012 | Wnuk et al. |
| 2014/0284257 A1 | 9/2014 | Park |

FOREIGN PATENT DOCUMENTS

| | | | |
|---|---|---|---|
| CN | 2799039 Y | 7/2006 | |
| CN | 101015754 A | 8/2007 | |
| CN | 201042644 Y | 4/2008 | |
| DE | 3405179 A1 | 8/1985 | |
| DE | 202005019664 U1 * | 2/2007 | ........... B01D 29/114 |
| DE | 102007054737 A1 | 5/2009 | |
| JP | 06028685 B | 4/1994 | |
| JP | 09276620 A | 10/1997 | |
| KR | 20070121734 A | 12/2007 | |
| KR | 101169436 B1 | 7/2012 | |
| KR | 101254776 B1 | 4/2013 | |

OTHER PUBLICATIONS

Ralf Wnuk; "Filter Device"; Bibliograhic Data of DE102007054737 (A1);May 20, 2009; http://worldwide.espacenet.com.

Juergen Roll; "Backwash Filter"; Bibliograhic Data of DE3405179 (A1); Aug. 14, 1985; http://worldwide.espacenet.com.

Office Action dated Nov. 7, 2016 and Search Report for Chinese Patent Application 201480063270.5; 6 pgs; The State Intellectual Property Office of the P.R.C, People's Republic of China.

Zhang Xiaoqiang et al.; "Automatic Back Flush Filter"; Bibliographic Data of CN201042644 (Y); Apr. 2, 2008; http://worldwide.espacenet.com.

Yu Jianping; "Filter"; Bibliographic Data of CN101015754 (A); Aug. 15, 2007; http://worldwide.espacenet.com.

Yongshan Wei; "On-line Full Automatic Filtering Apparatus"; Bibliographic Data of CN2799039 (Y); Jul. 26, 2006; http://worldwide.espacenet.com.

Pulun Lu; "Automatic Back-Cleaning Precision Filter"; Bibliographic Data of CN2508833 (Y); Sep. 4, 2002; http://worldwide.espacenet.com.

Zhang Zhongqiao et al.; "Full Automatic Back-Flushing Filter"; Bibliographic Data of CN2193197 (Y); Mar. 29, 1995; http://worldwide.espacenet.com.

Jung Il Kang; "Filter Apparatus Having Pressurizing System"; Bibliographic data of KR101254776 (B1); Apr. 15, 2013; http://worldwide.espacenet.com.

Byung Keun Park; "Press and Reverse Washing Typed Filtering Device by Filter Drum"; Bibliographic data of KR101169436 (B1); Jul. 27, 2012; http://worldwide.espacenet.com.

Ralf Wnuk et al.; "Filter Installation and Method for Operating One Such Filter Installation"; Bibliographic data of KR20070121734 (A); Dec. 27, 2007; http://worldwide.espacenet.com.

Deguchi Shuji; "Ultrafine Type Filter for Filtration of Sea Water"; Abstract of JP09-276620 A; Oct. 28, 1997; https://www4.j-platpat.inpit.go.jp.

International Search Report; International Searching Authority/KR dated Feb. 26, 2015; International Application No. PCT/KR2014/010827; 2 pages; International Searching Authority/Korean Intellectual Property Office; Daejeon, Republic of Korea.

* cited by examiner

FILTER DEVICE

TECHNICAL FIELD

The present invention relates to a filter device, and more particularly, to a filter device for backwashing a filter member which is used in a process of filtering out foreign substances, microbes, and/or the like included in seawater or fresh water.

BACKGROUND ART

Generally, a ballast tank for storing ballast water is installed in ships, for adjusting the balance and sea gauge of each of the ships.

Freight is loaded on a ship, and when the front-back balance and/or left-right balance of the ship are/is not made, the ship may be balanced by supplying the ballast water to the ballast tank or discharging the ballast water from the ballast tank. Also, ships are generally designed to economically and stably sail when freight is loaded thereon. Therefore, a condition similar to a freight-loaded state is provided to a ship by adjusting the amount of ballast water stored in the ballast tank according to the amount of loaded freight, thereby enabling the ship to stably sail.

Here, the ballast water stored in the ballast tank is adjusted by supplying or discharging seawater/fresh water, located near the ship, to or from the ballast tank with a pump. However, foreign substances (i.e., inorganic substances such as pebbles, sand, and mud, creatures such as fishes and shells, shellfish, and plankton, and organic substances) in a ship-located area can flow into the ballast tank in a process of supplying the ballast water to the ballast tank. Therefore, when the ship sails at a long distance, the foreign substances are precipitated and stuck, causing a reduction in a function of the ballast tank. Also, when the ballast water is discharged from the ballast tank while freight is being loaded on the ship, creatures and organic substances included in the ballast water are discharged together, and for this reason, the surrounding ecosystem is changed, causing an adverse effect on an ambient environment.

Therefore, international maritime organization (IMO) has introduced the ballast water purification rule in 2004, for preventing an ecosystem from being damaged due to ballast water. Accordingly, ships which sail at a long distance should be essentially equipped with a device for removing foreign substances such as creatures or organic substances included in ballast water. Also, a large amount of ballast water is used in large ships such as oil tankers, containers, and LNG carriers which sail at a long distance.

Therefore, it is required to develop an efficient filter device for quickly filtering out a large amount of seawater or fresh water which is used as ballast water for large ships. Also, it is required to develop a filter device that quickly backwashes a filter member while filtering out foreign substances such as microbes included in seawater or fresh water, thereby enhancing the filtering efficiency of the filter member.

DISCLOSURE

Technical Problem

Therefore, the present invention has been made in view of the above problems, and it is an object of the present invention to provide a filter device which filters out foreign substances included in ballast water and backwashes filter members simultaneously, and moreover, allows all the filter members to perform only a filtering process, thereby further enhancing filtering performance.

Technical Solution

To accomplish the above and other objects, the present invention may include the following configurations.

In accordance with one aspect of the present invention, a filter device includes: a filter housing including an inflow port, through which ballast water flows in, and an outflow port through which the ballast water flows out; a plurality of filter members provided in the filter housing to filter out a foreign substance included in the ballast water; and a backwashing unit coupled to at least one of the plurality of filter members to filter out the foreign substance by using a difference internal pressure and atmospheric pressure. The backwashing unit is provided for the ballast water to flow in so that when it is required for the backwashing unit to remove the foreign substance, at least one of the plurality of filter members coupled to the backwashing unit filters out the foreign substance included in the ballast water.

Advantageous Effect

As is apparent from the above description, the present invention has the following effects.

The present invention filters out foreign substances included in ballast water and backwashes filter members simultaneously, and moreover, allows all the filter members to perform only a filtering process, thereby further enhancing filtering performance.

MODE FOR INVENTION

Hereinafter, embodiments of a filter device according to the present invention will be described in detail with reference to the accompanying drawings.

As illustrated in FIGS. 1 to 4, a filter device 1 according to an embodiment of the present invention may be a device for filtering out foreign substances such as inorganic substances, microbes, and/or the like included in water such as seawater or fresh water which is supplied to a ballast tank as ballast water for adjusting the balance and sea gauge of a ship. However, the present invention is not limited to ships, and the filter device 1 according to the present invention may be variously applied to other devices which need to filter out foreign substances such as inorganic substances, microbes, and/or the like included in water such as seawater or fresh water flowing into the ballast tank. The water such as seawater or fresh water supplied to the ballast tank may be referred to as ballast water. Hereinafter, a generic name for liquids such as ballast water, seawater, and fresh water may be water.

The filter device 1 according to an embodiment of the present invention may include a filter housing 10 that includes an inflow port 11 through which water flows in and an outflow port 37 through which the water flowed in through the inflow port 11 flows out, a plurality of filter members 50 that are installed in the filter housing 10 and are each provided in a hollow form to filter the water flowed in through the inflow port 11, an inflow unit 13 that is installed in the filter housing 10 and is provided in at least one side of each of the filter members 50 in order for the water, flowed in through the inflow port 11, to be supplied to a filter opening 51 provided in each of the filter members 50, and a backwashing unit 70 that includes a coupling pipe 71 coupled to at least one of the plurality of filter members 50 in order for foreign substances, filtered out by the filter members 50, to be backwashed from the filter members 50.

Figure 1:
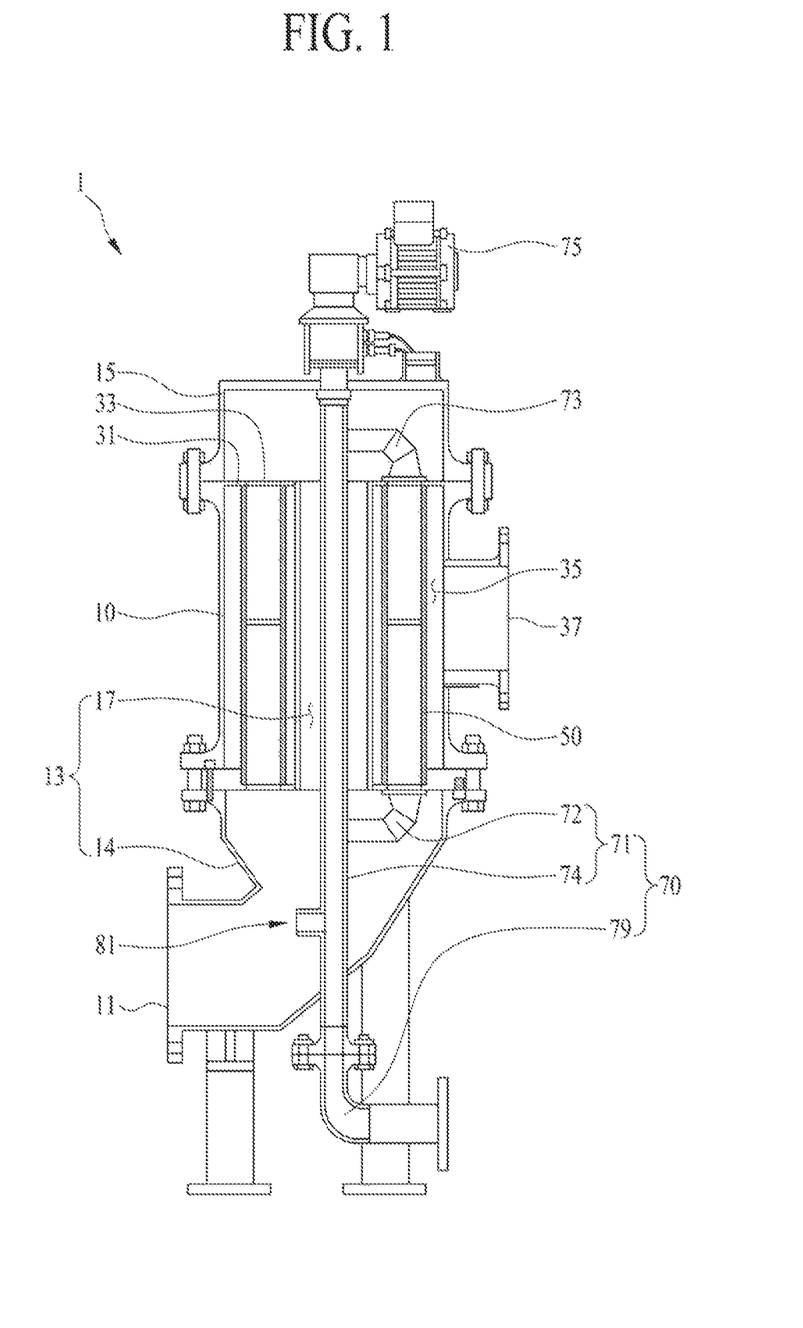
FIG. 1 is a schematic view of a filter device according to an embodiment of the present invention.

The filter housing 10 may configure an outer appearance of the filter device 1. The filter housing 10, for example, may be installed in an inlet area into which water of a ballast tank (not shown) of a ship flows, and the water may be pumped by a pump (not shown) or the like installed in the ballast tank (not shown) to flow into the filter housing 10. A filter mounting part 31 in which the filter member 50 is accommodated and equipped may be provided in the filter housing 10, for filtering the water flowed in through the inflow port 11.

The inflow port 11 may be provided in a lower area of the filter housing 10 for example. However, the inflow port 11 is not limited thereto and may be provided in various areas such as an upper area and the like of the filter housing 10 in order for water to flow in. Also, for example, the outflow port 37 may be provided in a side of the filter housing 10 where the filter mounting part 31 is provided. However, the outflow port 37 is not limited thereto and may be provided in various areas such as a lower area and the like of the filter housing 10 in order for water to flow out.

For example, the filter members 50 may be installed in a vertical direction in the filter housing 10. In this case, the inflow unit 13 may include a lower inflow part 14 provided under each of the filter members 50 and an upper inflow part 15 provided on each of the filter members 50. Also, the inflow unit 13 may include an inflow path 17 that is provided in a center area of the filter housing 10 and communicates the lower inflow part 14 with the upper inflow part 15. However, the present invention is not limited thereto, and the filter members 50 may be installed in a horizontal direction in the filter housing 10. In this case, the inflow unit 13 may be provided in each of both sides of the filter member 50. Also, the inflow unit 13 may be provided in only one side of the filter member 50.

The lower inflow part 14 may be provided in a lower area of each of the filter members 50 in order for water, flowing in through the inflow port 11, to be supplied through the filter opening 51 provided in a lower portion of each of the filter members 50. The upper inflow part 15 may be provided in an upper area of each of the filter members 50 so that the water flowing in through the inflow port 11 flows in through the lower inflow part 14 and the inflow path 17 and is supplied through the filter opening 51 provided in an upper portion of each of the filter members 50.

The inflow path 17, for example, may be through provided in a center area of the filter mounting part 31 provided in a cylindrical shape and may supply water, flowing into the lower inflow part 14, to the upper inflow part 15. However, the inflow path 17 is not limited to the center area of the filter housing 10 and may be provided in another area of the filter housing 10 in order for the water, flowing into the lower inflow part 14, to be supplied to the upper inflow part 15.

Figure 2:
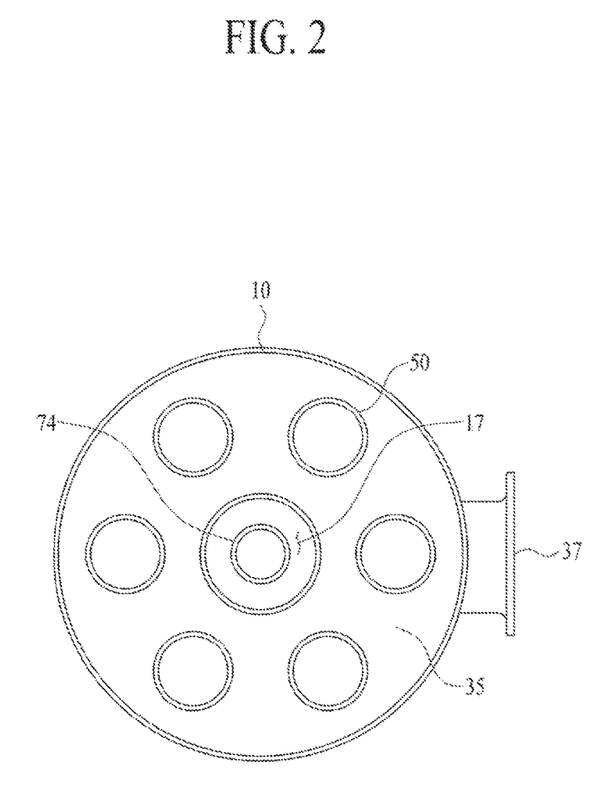
FIG. 2 is a cross-sectional view taken along line A-A of the filter device of FIG. 1.

The filter mounting part 31, for example, may be provided in a cylindrical shape having a follow form in order for the plurality of filter members 50 to be accommodated and installed therein. However, the filter mounting part 31 may be provided in various shapes such as a polygonal pillar having a hollow form. A plurality of through flow paths 33 may be provided in correspondence with the filter openings 51 of the filter members 50 which are installed in the vertical direction in a lower portion and an upper portion of the filter mounting part 31. For example, six filter members 50 may be mounted at an equal angle on the filter mounting part 31. However, the filter mounting part 31 is not limited thereto, and five or less filter members 50 or seven or more filter members 50 may be mounted on the filter mounting part 31. The lower inflow part 14 may be disposed under the filter mounting part 31, and the upper inflow part 15 may be disposed on the filter mounting part 31. Also, the inflow path 17 may be provided in the center area of the filter mounting part 31 having a hollow shape. An outflow part 35, accommodating water which flows into the filter member 50 through flow path 33 and is filtered through a filter hole 53 of the filter member 50, may be provided in the filter mounting part 31. The outflow port 37 may be provided in one side of the filter mounting part 31 in order for the filtered water, accommodated in the outflow part 35, to be discharged in a direction toward the ballast tank (not shown).

The through flow path 33, for example, may be provided as six at an equal angle in each of the lower portion and upper portion of the filter mounting part 31 in correspondence with the filter openings 51 of six filter members 50. Therefore, in a filtering process, water may flow in through the filter opening 51 of the filter member 50 from the upper inflow part 15 and the lower inflow part 14 via the through flow path 33 and may be discharged to the outflow part 35 through the filter hole 53 of the filter member 50.

The outflow part 35 may be an element that accommodates water filtered through the filter hole 53 of the filter member 50 before the filtered water is discharged, and may be provided outside the filter member 50 in the filter mounting part 31.

Figure 3:
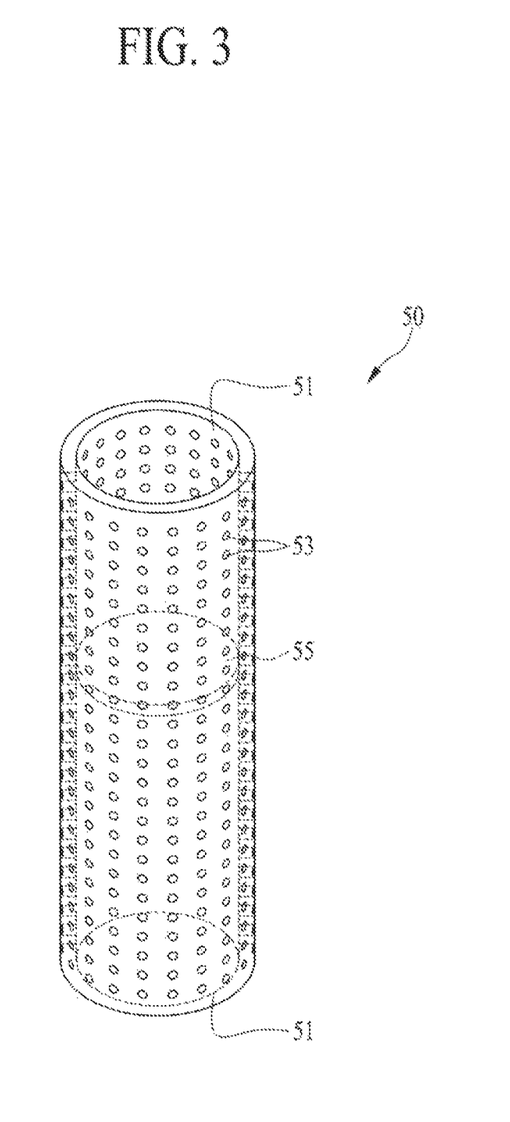
FIG. 3 is a schematic view of a filter member of the filter device of FIG. 1.

The filter member 50 may be equipped in the filter mounting part 31 and may be provided in a hollow form to filter water which flows from both sides into a center. For example, the filter member 50 may be provided in a pipe shape, and the filter opening 51 may be provided in each of both sides of the filter member 50 in order for water to flow in or out. A plurality of the filter holes 53 may be provided in the filter member 50 to filter water flowing in through the filter opening 51. For example, the filter hole 53 of the filter member 50 may be provided to filter out a foreign substance a which is included in water flowing in and has a size of 45 µm to 50 µm. However, the filter hole 53 of the filter member 50 is not limited thereto and may be provided to filter out the foreign substance a having a size of less than 45 μm depending on the kind or state of water flowing in and the field to which the filter device 1 according to the present invention is applied. Therefore, water flowing in through the filter opening 51 of the filter member 50 may pass through the filter hole 53 to filter out foreign substances.

The filter device 1 according to a first embodiment of the present invention may further include a division member 55 that is provided in the filter member 50 to divide and filter water supplied to the filter opening 51 of the filter member 50 in a filtering process of the filter member 50 and to divide and backwash the filter member 50 in a backwashing process of the filter member 50.

The division member 55 may be equipped in the filter member 50 having a hollow form, may divide and filter water which flows in through each of the filter openings 51, provided in both sides of the filter member 50, from the upper inflow part 15 and the lower inflow part 14, and may divide and backwash the filter member 50 in a backwashing process performed by the backwashing unit 70. Therefore, in the filtering process, when there is only the lower inflow part 14, filtering may be much performed in a lower area of the filter member 50 adjacent to the lower inflow part 14, and a lot of the foreign substances a are caught in the lower area of the filter member 50 adjacent to the lower inflow part 14, causing a reduction in filtering efficiency. However, water may flow in from the both sides of the filter member 50 through the lower inflow part 14 and the upper inflow part 15, thereby enhancing filtering efficiency. Also, since the division member 55 is further installed, the filter member 50 may separate and filter water flowing in from the lower inflow part 14 and water flowing in from the upper inflow part 15, thereby further enhancing filtering efficiency. Also, the division member 55 may be installed when the inflow unit 13 is provided in each of the both sides of the filter member 50, and thus, when the inflow unit 13 is provided in only one side of the filter member 50, the division member 55 may not be installed.

The backwashing unit 70 may be coupled to at least one of the plurality of filter members 50 to remove foreign substances by using a difference between internal pressure and atmospheric pressure. When the backwashing unit 70 needs not remove foreign substances, the backwashing unit 70 may be provided to enable inflow of water, in order for the at least one of the plurality of filter members 50 coupled to the backwashing unit 70 to filter out foreign substances included in the water.

Therefore, the filter device 1 according to the present invention may simultaneously filter out and backwash foreign substances included in water, and moreover, all the filer members 50 may be set to perform only a filtering process, thereby further enhancing filtering performance.

The backwashing unit 70 may include the coupling pipe 71 that is rotatably provided to be coupled to both sides of at least one of the plurality of filter members 50, a coupling pipe driver 75 that rotates the coupling pipe 71 in order for the coupling pipe 71 to be coupled to the at least one of the plurality of filter members 50, and a discharging pipe 79 that communicates with the coupling pipe 71 in order for the foreign substance a filtered out by the filter member 50 to be discharged through the coupling pipe 71.

The coupling pipe 71, for example, may include a lower coupling pipe 72 that is provided in the lower inflow part 14 and is coupled to a lower side of the filter member 50, an upper coupling pipe 73 that is provided in the upper inflow part 15 and is coupled to an upper side of the filter member 50, and a center coupling pipe 74 that is provided in the inflow path 17 and couples the lower coupling pipe 72 to the upper coupling pipe 73.

The lower coupling pipe 72, for example, may be rotatably provided to be selectively coupled to one of the plurality of through flow paths 33 provided in a lower portion of the filter mounting part 31. Therefore, in a backwashing process, the foreign substances a accumulated in the filter member 50 communicating with the lower coupling pipe 72 may be discharged through the lower coupling pipe 72.

The upper coupling pipe 73, for example, may be rotatably provided to be selectively coupled to one of the plurality of through flow paths 33 provided in an upper portion of the filter mounting part 31. Therefore, in a backwashing process, the foreign substances a accumulated in the filter member 50 communicating with the upper coupling pipe 73 may be discharged through the upper coupling pipe 73.

The center coupling pipe 74, for example, may be provided in a center area of the filter mounting part 31 having a hollow form to couple the upper coupling pipe 73 to the lower coupling pipe 72, and the discharging pipe 79 may be coupled to a lower side thereof. That is, for example, the center coupling pipe 74 may be installed in the inflow path 17 provided in the center area of the filter mounting part 31. Therefore, the foreign substance a transported through the upper coupling pipe 73 and the lower coupling pipe 72 may be discharged to the discharging pipe 79 through the center coupling pipe 74.

The coupling pipe driver 75, for example, may be provided in order for the center coupling pipe 74, the upper coupling pipe 73, and the lower coupling pipe 72 to pivot as one body. The coupling pipe driver 75, for example, may be provided as a motor or the like in order for the center coupling pipe 74, the upper coupling pipe 73, and the lower coupling pipe 72 to pivot as one body and may be installed over the filter housing 10. However, the coupling pipe driver 75 is not limited thereto and may be installed at various positions such as a side under the filter housing 10, etc. Also, the coupling pipe driver 75 may be driven to couple the upper coupling pipe 73 and the lower coupling pipe 72 to the filter member 50, in which a lot of the foreign substances a are caught, among the plurality of filter members 50. In this case, in a method of determining the filter member 50 in which a lot of the foreign substances a are caught, a pressure sensor (not shown) may be equipped in each of the plurality of filter members 50, and by measuring an internal pressure of each of the filter members 50, the filter member 50 where the measured pressure is high may be determined as a filter member in which a lot of the foreign substances a are caught. In this manner, if the filter member 50 in which a lot of the foreign substances a are caught is determined, the coupling pipe driver 75 may be controlled to couple the determined filter member 50 to the upper coupling pipe 73 and the lower coupling pipe 72.

The discharging pipe 79, for example, may be provided under the filter housing 10 to discharge the foreign substance a, transported through the center coupling pipe 74, to the outside. Therefore, in the filter device 1 according to the present invention, a backwashing process may be performed simultaneously with a filtering process for example. That is, the upper coupling pipe 73 and the lower coupling pipe 72 may be coupled to one of the plurality of filter members 50 by the coupling pipe driver 75. Also, water may be supplied to the filter housing 10 through the inflow port 11 and may be fully filled in the filter housing 10, causing an increase in pressure. At this time, a pressure of the discharging pipe 79 may become atmospheric pressure, and an internal pressure of the filter housing 10 may be high. Therefore, the water may flow backward from the outflow part 35 of the filter housing 10 to the filter hole 53 of the filter member 50 coupled to the upper coupling pipe 73 and the lower coupling pipe 72, and thus, a backwashing phenomenon where the foreign substance a is washed and desorbed may occur. The desorbed foreign substance a may be discharged to the discharging pipe 79 through the upper coupling pipe 73, the lower coupling pipe 72, and the center coupling pipe 74 along with the water. Therefore, when there is only the lower coupling pipe 72 in the backwashing process, backwashing may be much performed in a lower area of the filter member 50 adjacent to the lower coupling pipe 72, and thus, the foreign substance a in the lower area of the filter member 50 adjacent to the lower coupling pipe 72 may be washed well, but the backwashing efficiency of the foreign substance a in an upper area instead of the lower area is reduced. However, the water may be discharged to both sides of the filter member 50 though the lower coupling pipe 72 and the upper coupling pipe 73, and thus, the foreign substances a in an area adjacent to the upper coupling pipe 73 as well as the lower coupling pipe 72 may be washed well, thereby enhancing backwashing efficiency. Also, since the filter device 1 according to the present invention further includes the division member 55, the water discharged to both sides of the filter member 50 though the lower coupling pipe 72 and the upper coupling pipe 73 may be divided, thereby further enhancing backwashing efficiency.

The division member 55, for example, may be installed at a position higher than that of a middle portion of the filter member 50 which is installed in the vertical direction. For example, the division member 55 may be installed at a position corresponding to approximately three-fifth to four-fifth of a length of the filter member 50. However, the division member 55 may be installed may be installed at a position corresponding to approximately one-half to three-fifth of the length or four-fifth or more of the filter member 50, based on the length of the filter member 50 or a diameter of the filter opening 51. The reason that the filter member 55 is installed at a position higher than that of the middle portion of the filter member 50 is for more effectively filtering inflow water because an inflow pressure of water flowing from the upper inflow part 15 into the filter member 50 is weaker than that of water flowing from the lower inflow part 14 into the filter member due to an influence of gravity, and thus, the water flowing from the lower inflow part 14 into the filter member is relatively more. Also, since the amount of water discharged to the lower coupling pipe 72 is more than that of water discharged to the upper coupling pipe 73 due to an influence of gravity even in the backwashing process, the division member 55 may be installed at a position higher than that of the middle portion of the filter member 50, thereby further enhancing backwashing efficiency. However, when a diameter of the filter opening 51 in an upper side of the filter member 50 is greater than that of filter opening 52 in a lower side of the filter member 50, the amount of water passing through the filter opening 51 in the upper side of the filter member 50 is relatively more, and in this case, the division member 55 may be installed at a position lower than that of the middle portion of the filter member 50.

Figure 4:
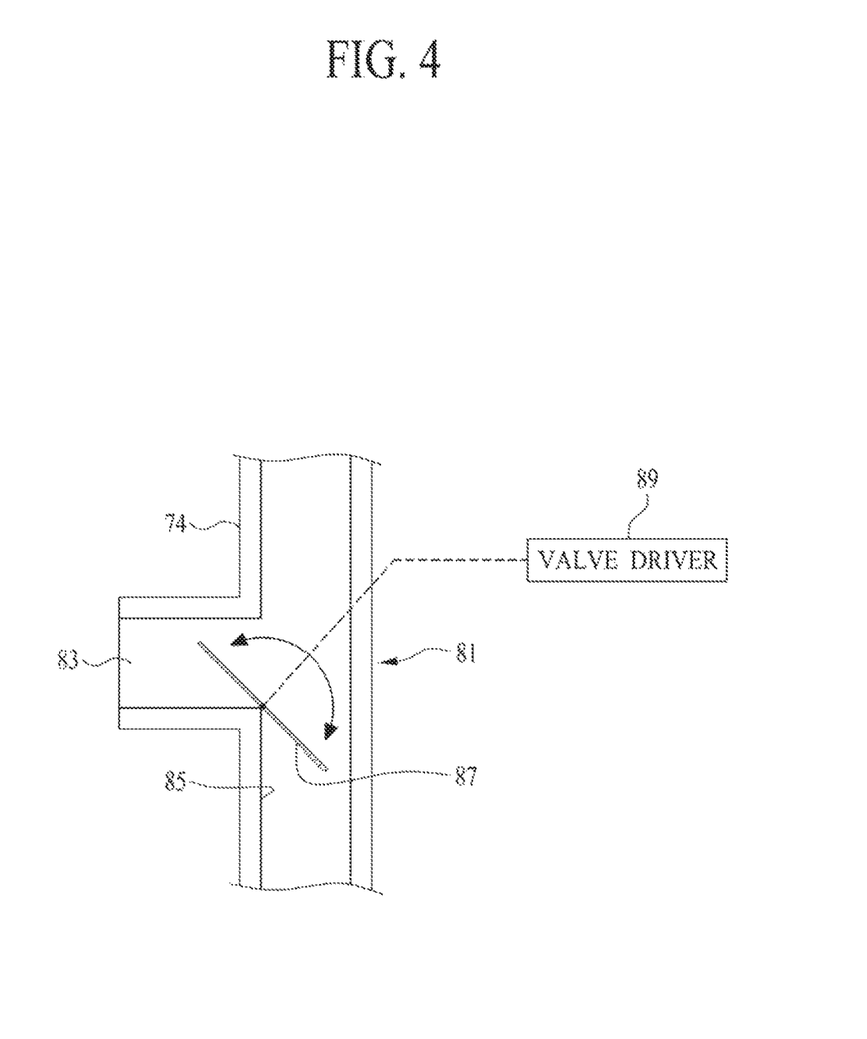
FIG. 4 is a schematic view of a selection valve of a filter device according to an embodiment of the present invention.

The filter device 1 according to the present invention may further include a selection valve 81 that is installed in the coupling pipe 71 to be selectively opened or closed for supplying or blocking water, flowing into the inflow port 11, to the coupling pipe 71.

The selection valve 81 may allow the backwashing unit 70 to selectively communicate with the inflow port 11 of the filter housing 10 or the air. The selection valve 81 may be installed in the coupling pipe 71 to selectively open or close an inflow opening 83, which is provided in the coupling pipe 71 in order for water flowing into the inflow port 11 to flow into the coupling pipe 71, and an outflow opening 85 which is provided in the coupling pipe 71 to communicate with the discharging pipe 79.

The selection valve 81, for example, may be provided as a 3-way valve in which a valve disk 87 is pivoted by the valve driver 89, and the inflow opening 83 and the outflow opening 85 is selectively opened or closed. However, the selection value 81 is not limited thereto and may be provided as various types such as a two-motor value to individually open or close the inflow opening 83 and the outflow opening 85. The selection value, for example, may be installed in a center coupling pipe 74 in the coupling pipe 71. That is, the selection valve 81 may be installed in a lower area of the center coupling pipe 74 adjacent to the inflow port 11 to supply higher-pressure water to the coupling pipe 71. In this case, the inflow opening 83 and the outflow opening 85 may also be installed in the lower area of the center coupling pipe 74 adjacent to the inflow port 11. However, the selection valve 81 is not limited thereto and may be installed in various positions such as a middle area or an upper area of the center coupling pipe 74, the lower coupling pipe 72, the upper coupling pipe 73, etc. The selection valve 81 may drive the valve driver 89 according to a manipulation of a user or control by a controller (not shown). That is, when a measured internal pressure value of each of the filter members 50 is less than a predetermined value, it is determined that the backwashing process is not needed, and the selection valve 81 may drive the valve driver 89 to open the inflow opening 83 and close the outflow opening 85 according to the manipulation of the user or control by the controller (not shown). Also, when a measured internal pressure value of one of the filter members 50 is greater than the predetermined value, it is determined that the backwashing process is needed, and the selection valve 81 may drive the valve driver 89 to close the inflow opening 83 and open the outflow opening 85 according to the manipulation of the user or control by the controller (not shown).

Referring to FIGS. 1 to 8, the filter device 1 according to the present invention may further include a flow rate control valve 93 (see FIG. 5) that controls the amount of water flowed out through the inflow port 37.

Figure 5:
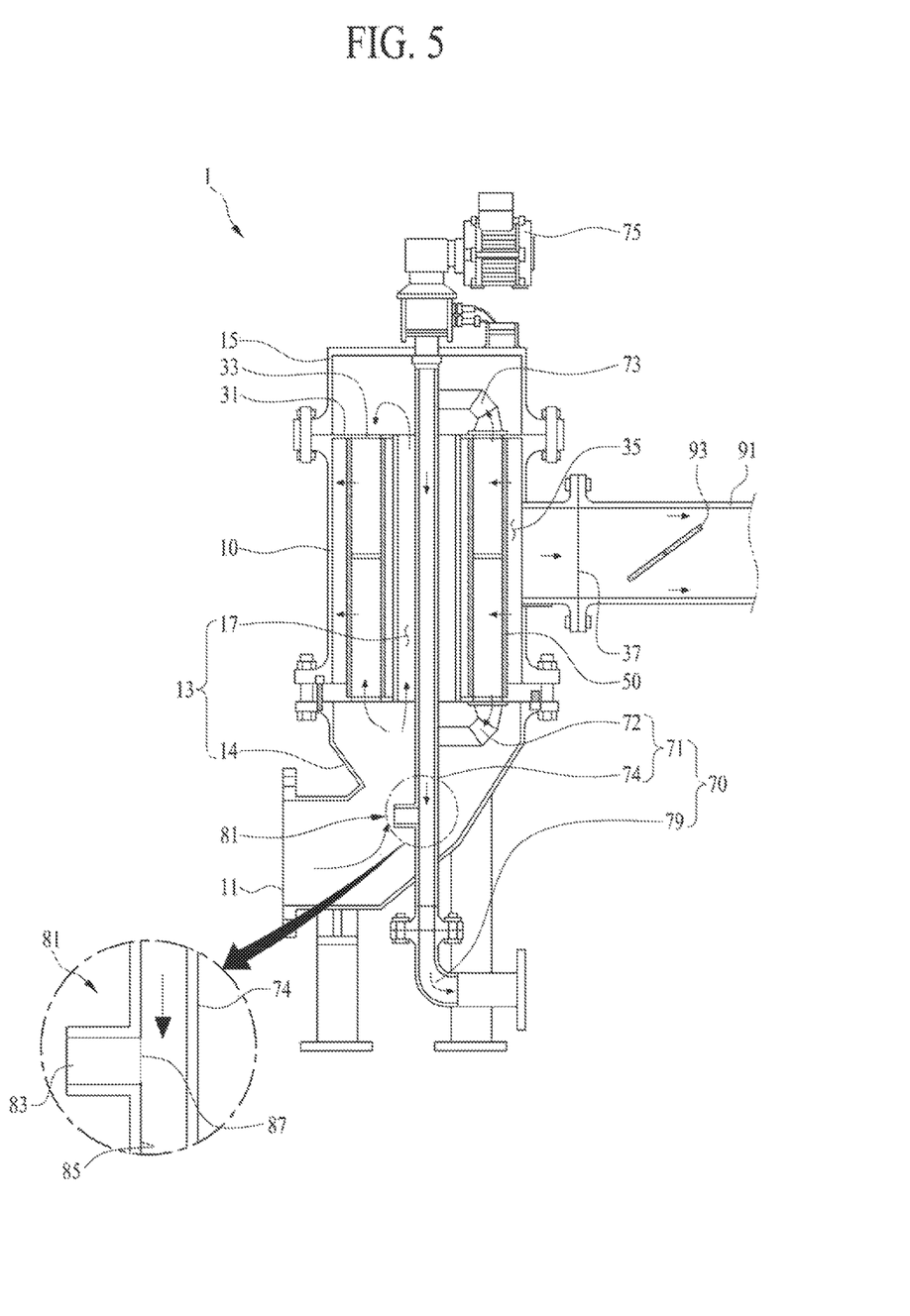
FIG. 5 is a schematic view illustrating a case of simultaneously performing a filtering process and a backwashing process of a filter device according to an embodiment of the present invention.

The flow rate control valve 93, for example, may be installed in an outflow pipe 91 coupled to the outflow port 37. However, the flow rate control valve 93 is not limited thereto and may be installed in the outflow port 37 or at various positions to control the amount of water flowed out through the outflow port 37.

As illustrated in FIG. 5, when the selection valve 81 closes the inflow opening 83 and opens the outflow opening to perform the filtering process and the backwashing process simultaneously, the flow rate control valve 93 may be controlled according to the manipulation of the user or control by the controller (not shown) to reduce the amount of water flowed out through the outflow 37. That is, in a case of performing the filtering process and the backwashing process simultaneously, the controller (not shown) may control an angle of a valve disk of the flow rate control valve 93 based on a measured internal pressure value of the filter member 50 requiring backwashing to control the amount of water flowed out through the outflow 37. Therefore, in a case of performing the filtering process and the backwashing process simultaneously, the controller (not shown) may control the flow rate control valve 93 to reduce the amount of water flowed out through the outflow 37, and thus, an internal pressure of the outflow part 35 may be adjusted to high pressure, thereby preventing backwashing efficiency from being reduced in the backwashing process.

Figure 6:
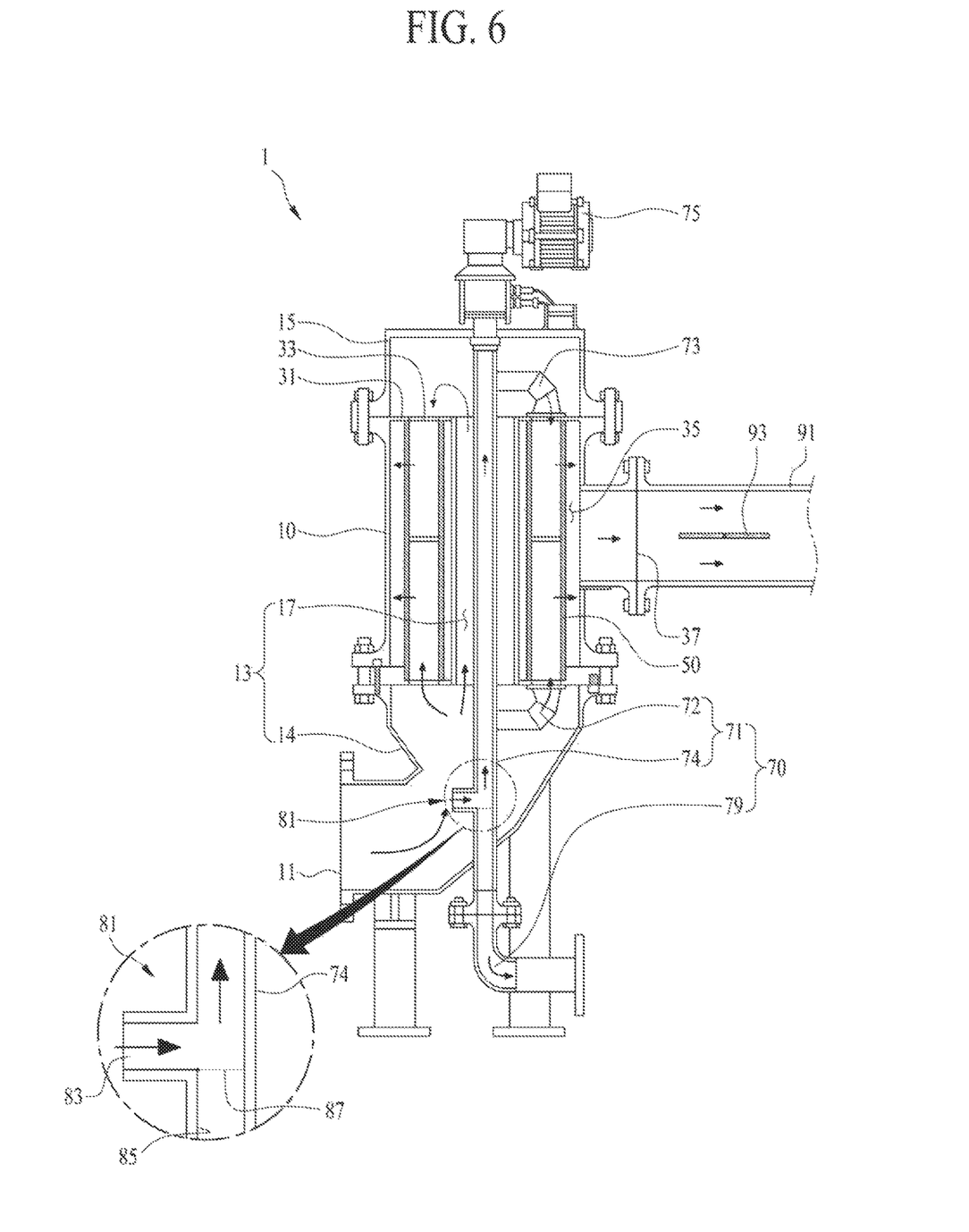
FIG. 6 is a schematic view illustrating a case of performing only a filtering process of a filter device according to an embodiment of the present invention.

Moreover, as illustrated in FIG. 6, in a case where the selection valve 81 opens the inflow opening 83 and closes the outflow opening 85 to perform only the filtering process, the flow rate control valve 93 may perform control to increase the amount of water flowed out through the outflow port 37. In this case, the flow rate control valve 93 may fully open the outflow port 37 in order for the amount of water flowed out through the outflow port 37 to become the maximum.

The filtering process and backwashing process of the filter device 1 according to an embodiment of the present invention will be described with reference to FIGS. 4 to 8.

Figure 8:
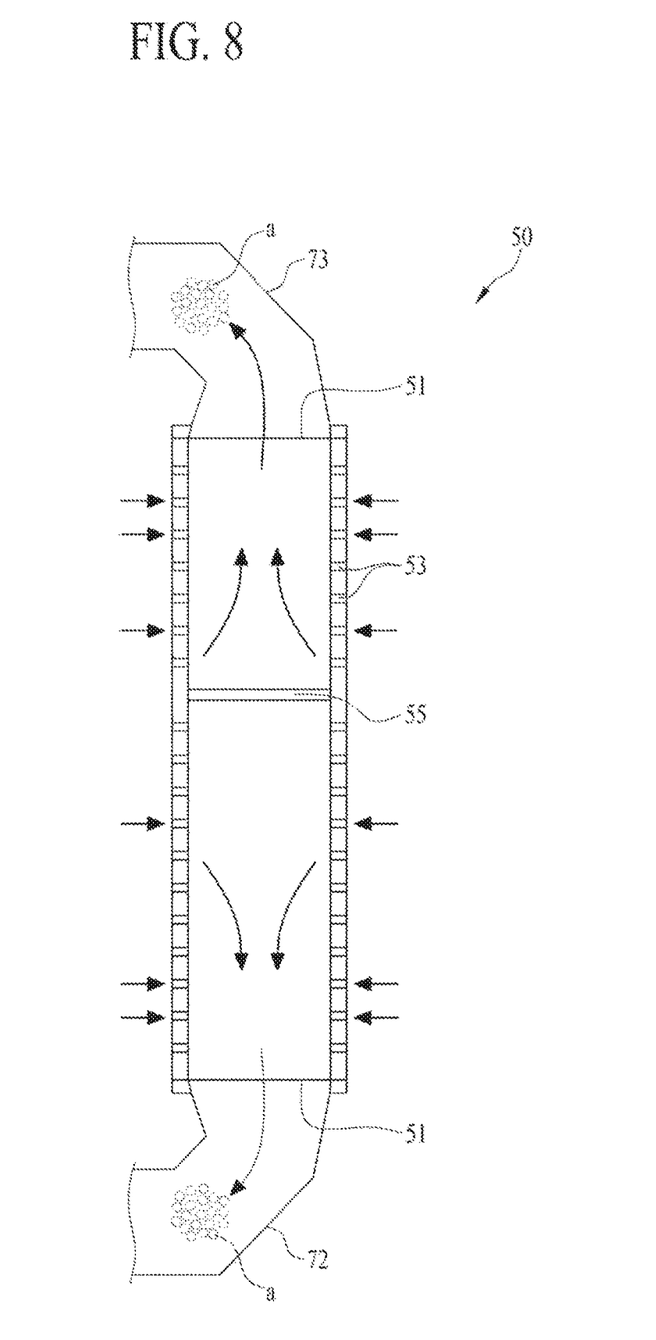
FIG. 8 is an enlarged view illustrating a backwashing process of a filter member of a filter device according to an embodiment of the present invention.

To first describe a case of performing the filtering process and the backwashing process simultaneously, the selection valve 81 may close the inflow opening 83 and may open the outflow opening 85. Also, water may be supplied to the filter housing 10 through the inflow port 11. Then, the supplied water may be transported to the lower inflow part 14, the inflow path 17, and the upper inflow part 15 and may be supplied to the plurality of filter members 50 through the through flow path 33 of the filter mounting part 31. The water supplied to the filter member 50 may pass through the filter hole 53 of the filter member 50 to thereby be filtered, and the filtered water may be discharged to the outflow port 37 through outflow part 35. In this case, since the flow rate control valve 93 is opened, the filtered water may be discharged to the outflow pipe 91 through the outflow port 37.

Such a filtering process may be performed simultaneously with the backwashing process. That is, water may flow in through the inflow port 11 and may be fully filled into the filter housing 10 to increase pressure. Also, the coupling pipe driver 75 may be driven to couple the upper coupling pipe 73 and the lower coupling pipe 72 to the filter member 50, in which a lot of the foreign substances a are caught, among the plurality of filter members 50. Therefore, a pressure of the discharging pipe 79 may become atmospheric pressure, and thus, the water may flow backward from the outflow part 35 of the filter housing 10 to the filter hole 53 of the filter member 50 coupled to the upper coupling pipe 73 and the lower coupling pipe 72 to wash the foreign substance a. The washed foreign substance a may be discharged to the discharging pipe 79 through the upper coupling pipe 73, the lower coupling pipe 72, and the center coupling pipe 74. In this manner, in a case of performing the filtering process and the backwashing process simultaneously, an amount by which filtered water is discharged through the outflow port 37 may be reduced by controlling the flow rate control valve 93, and thus, an internal pressure of the outflow part 35 may be adjusted to high pressure to effectively remove the foreign substance a caught in the filter hole 53 of the filter member 50, thereby enhancing backwashing efficiency.

Moreover, when a measured internal pressure value of each of the filter members 50 is less than the predetermined value, the selection valve 81 may open the inflow opening 83 and may close the outflow opening 85, thereby allowing all the filter members 50 to perform the filtering process.

Figure 7:
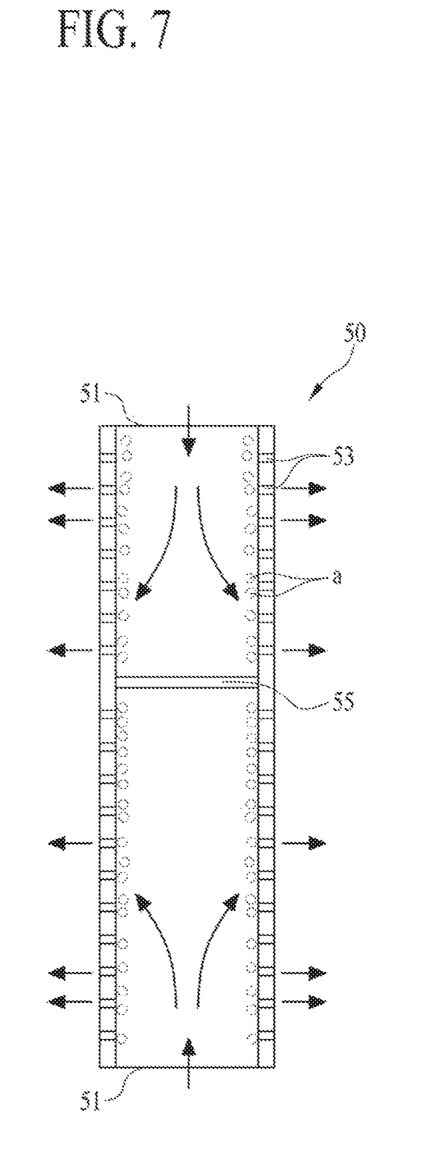
FIG. 7 is an enlarged view illustrating a filtering process of a filter member of a filter device according to an embodiment of the present invention.

To next describe a case of performing only the filtering process, the selection valve 81 may open the inflow opening 83 and may close the outflow opening 85. Also, water may be supplied to the filter housing 10 through the inflow port 11. Then, the supplied water may be transported to the lower inflow part 14, the inflow path 17, and the upper inflow part 15 and may be supplied to the plurality of filter members 50 through the through flow path 33 of the filter mounting part 31. Also, the water may be supplied through the inflow opening 83 which is provided in the center coupling pipe 74 of the backwashing unit 70, and may be supplied to the filter opening 51 of the filter member 50, coupled to the backwashing unit 70, through center coupling pipe 74, the upper coupling pipe 73, and the lower coupling pipe 72. In this manner, the water supplied to all the filter members may pass through the filter hole 53 of the filter member 50 to thereby be filtered, and the filtered water may be discharged to the outflow port 37 through outflow part 35.

Therefore, since water is supplied to the filter openings 51 of the both sides of the filter member 50 through the lower inflow part 14 and the upper inflow part 15 in the filtering process, the filtering efficiency of the filter device 1 according to the present invention is further enhanced than a case where only the lower inflow part 14 is provided. Also, when the division member 55 is provided in the filter member 50, water flowing in from the lower inflow part 14 and water flowing in from the upper inflow part 15 may be separately filtered, and thus, filtering efficiency is further enhanced than a case where the division member 55 is not provided. Also, the division member 55 may be installed at a position higher than that of the middle portion of the filter member 50, thereby further enhancing filtering efficiency in consideration of an influence of gravity.

Moreover, since water including the foreign substance a is discharged to the lower coupling pipe 72 and the upper coupling pipe 73 through the filter openings 51 of the both sides of the filter member 50 in the backwashing process, the filtering efficiency of the filter device 1 according to the present invention is further enhanced than a case where only the lower coupling pipe 72 is provided. Also, when the division member 55 is provided in the filter member 50, water flowing in from the lower inflow part 14 and water flowing in from the upper inflow part 15 may be separately filtered, and thus, filtering efficiency is further enhanced than a case where the division member 55 is not provided. Also, the division member 55 may be installed at a position higher than that of the middle portion of the filter member 50, thereby further enhancing filtering efficiency in consideration of an influence of gravity.

Moreover, in a case of performing only the filtering process without performing the backwashing process, the filter device 1 according to the present invention may use the selection valve 81, all the filter members 50 may perform the filtering process, thereby further enhancing filtering efficiency.

Figure 9:
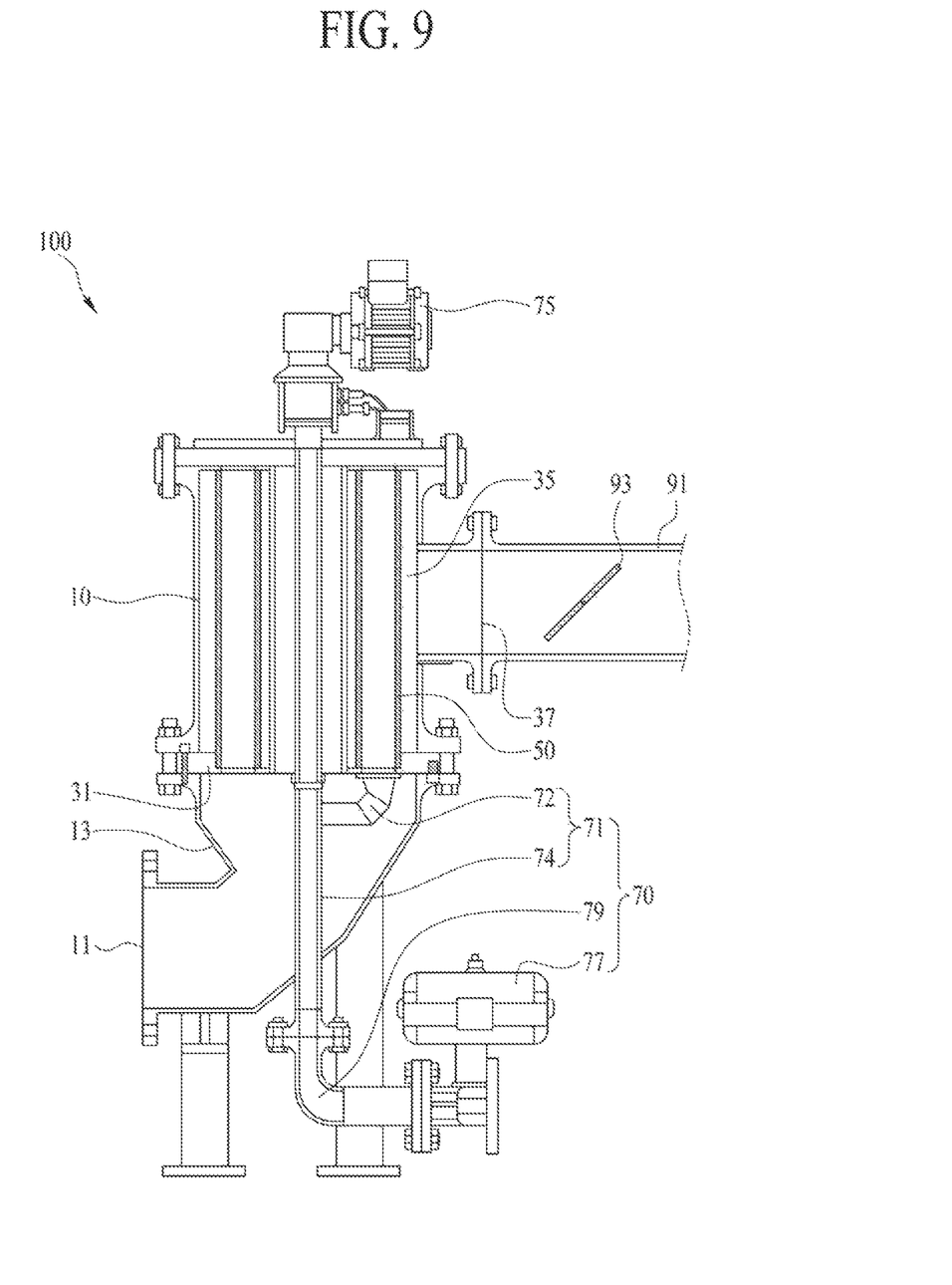
FIG. 9 is a schematic view of a filter device according to another embodiment of the present invention.

FIG. 9 is a schematic view of a filter device according to another embodiment of the present invention.

A filter device 100 according to another embodiment of the present invention has a difference with the above-described embodiment in that the upper inflow part 15 and the inflow path 17 among inflow parts 13, the upper coupling pipe 73 among the coupling pipes 71 of the backwashing unit 70, the selection valve 81, and the division member 50 according to the above-described embodiment are omitted, and a backwashing valve 77 is added. Except for the difference, the present embodiment is the same as the above-described embodiment. The following description will focus on the difference.

The backwashing valve 77, for example, may be equipped in a discharging pipe 79 to open or close the discharging pipe 79. However, the backwashing valve 77 may be mounted between a coupling pipe 71 and the discharging pipe 79 to open or close the discharging pipe 79.

Through such a configuration, when the backwashing valve 77 is in an opened state, a pressure of the discharging pipe 79 may become atmospheric pressure, and an internal pressure of a filter housing 10 may be relatively high. Therefore, water may flow backward from an outflow part 35 of the filter housing 10 to a filter hole 53 of a filter member 50 coupled to an lower coupling pipe 72, and thus, a backwashing phenomenon where the foreign substance a is washed and desorbed may occur. The desorbed foreign substance a may be discharged to the discharging pipe 79 through the lower coupling pipe 72 along with the water, and thus, a filtering process and a backwashing process may be performed simultaneously. Also, when a measured internal pressure value of each of a plurality of the filter members 50 is less than a predetermined value, it is determined that a lot of the foreign substances a are caught in the filter member 50, and thus, the backwashing valve 77 may be opened or closed. In a case of performing the filtering process and the backwashing process simultaneously, an amount by which filtered water is discharged through an outflow port 37 may be reduced by controlling a flow rate control valve 93, and thus, an internal pressure of the outflow part 35 may be adjusted to high pressure to effectively remove the foreign substance a caught in the filter hole 53 of the filter member 50, thereby enhancing backwashing efficiency.

The present invention as described above are not limited to the above-described embodiments and the accompanying drawings and those skilled in the art will clearly appreciate that various modifications, deformations, and substitutions are possible without departing from the scope and spirit of the invention.

The invention claimed is:

1. A filter device comprising:
 a filter housing including an inflow port through which water flows in, and an outflow port through which the water flows out;
 a plurality of filter members in the filter housing, configured to filter out a foreign substance in the water;
 a backwashing unit comprising a rotatable coupling pipe configured to couple to opposite sides of each of the plurality of filter members and configured to backwash the foreign substance in one of the plurality of filter members using a difference between an internal pressure of the one of the plurality of filter members and atmospheric pressure, the rotatable coupling pipe comprising a lower coupling pipe configured to couple to a lower side of each of the plurality of filter members, an upper coupling pipe configured to couple to an upper side of each of the plurality of filter members, and a central coupling pipe coupled to the lower coupling pipe and the upper coupling pipe; and
 a three-way selection valve in the coupling pipe configured to selectively (i) open to supply the water from the inflow port to the coupling pipe and (ii) close to block the water in the inflow port from the coupling pipe, wherein the backwashing unit is configured such that the water flows in when removing the foreign substance, and at least one of the plurality of filter members coupled to the backwashing unit filters out the foreign substance in the water.

2. The filter device of claim 1, further comprising: an inflow unit in the filter housing, configured to supply the water from the inflow port to a filter opening in each of the plurality of filter members,
 wherein:
 the plurality of filter members are vertical in the filter housing, and
 the inflow unit comprises a lower inflow part under each of the plurality of filter members, an upper inflow part on each of the plurality of filter members, and an inflow path in a center area of the filter housing to communicate the lower inflow part with the upper inflow part.

3. The filter device of claim 1, wherein the backwashing unit comprises:
 a coupling pipe driver configured to rotate the coupling pipe such that the coupling pipe is coupled to at least one of the plurality of filter members.

4. The filter device of claim 2, further comprising a division member in each of the plurality of filter members configured to divide the water supplied to the filter opening of the corresponding filter member.

5. The filter device of claim 4, wherein the division member is higher than a middle portion of each of the plurality of filter members.

6. The filter device of claim 1, further comprising a flow rate control valve configured to control an amount of water that flows out through the outflow port.

7. The filter device of claim 6, wherein the flow rate control valve is configured to reduce an amount of the water that flows out through the outflow port when a filtering process and a backwashing process are performed simultaneously.

8. The filter device of claim 6, wherein the flow rate control valve is configured to increase the amount of water that flows out through the outflow port when a filtering process is performed.

9. The filter device of claim 1, further comprising a discharging pipe that communicates with the coupling pipe to discharge the foreign substance through the coupling pipe.

10. The filter device of claim 9, wherein the selection valve further comprises a valve driver, an inflow opening and an outflow opening, the inflow opening is in the coupling pipe and allows water in the inflow port to flow into the coupling pipe, the outflow opening communicates with the discharging pipe, and the valve driver is configured to open and close the inflow opening and the outflow opening.

11. The filter device of claim 10, wherein when a measured internal pressure value of each of the filter members is less than a predetermined value, the selection valve drives the valve driver to open the inflow port and close the outflow port.

12. The filter device of claim 11, wherein when the measured internal pressure value of one of the filter members is greater than the predetermined value, the selection valve drives the valve driver to close the inflow port and open the outflow port.

13. The filter device of claim 1, wherein the selection valve further comprises a valve disk, and the valve driver is configured to pivot the valve disk.

14. The filter device of claim 13, wherein pivoting the valve disk selectively opens and closes the inflow port and the outflow port.

15. The filter device of claim 1, wherein the selection valve is configured to supply higher-pressure water to the coupling pipe to backwash the plurality of filter members.

16. The filter device of claim 1, wherein each of the lower coupling pipe and the upper coupling pipe is rotatable.

17. The filter device of claim 1, further comprising a pressure sensor in each of the plurality of filter members, configured to measure the internal pressure of a corresponding one of the filter members.

* * * * *